[19] United States [15] 3,649,103
Kamimura [45] Mar. 14, 1972

[54] PHOTOGRAPHIC LENS SYSTEM

[72] Inventor: Hajime Kamimura, Tokyo, Japan
[73] Assignee: Ricoh Co., Ltd., Tokyo, Japan
[22] Filed: Apr. 15, 1970
[21] Appl. No.: 28,695

[30] Foreign Application Priority Data

Apr. 17, 1969 Japan..................................44/29923

[52] U.S. Cl.............................................350/226, 350/206
[51] Int. Cl............................................G02b 9/16, G02b 9/08
[58] Field of Search .................................350/226, 206, 210

[56] References Cited

UNITED STATES PATENTS 2,388,869  11/1945  Reiss..................................350/226 X
2,279,372  4/1942   Herzberger..........................350/226

Primary Examiner—David Schonberg
Assistant Examiner—Paul A. Sacher
Attorney—Henry T. Burke, Robert S. Dunham, P. E. Henninger, Lester W. Clark, Gerald W. Griffin, Thomas F. Moran, R. Bradlee Boal, Christopher C. Dunham and Robert Scobey

[57] ABSTRACT

A photographic lens system in which a stop may be positioned in an image space adjacent to the last refracting surface of the system. Three individual lenses are included, i.e., a positive single meniscus lens with its convex surface toward an object, a biconcave lens and a biconvex lens. The following relations are satisfied:

$0.3f < \Sigma d < 0.35f$
$0.105f < d_1 < 0.110f$
$0.8f < |r_2| < 1.0f$
$0.55f < |r_6| < 0.65f$
$1.65 < n_1$
$1.65 < n_3$ where $f$=the focal length of the lens system; $\Sigma d$=the total thickness or dimension along the optical axis of the system; $d_1$=the thickness of the first or positive single meniscus lens; $r_2$=the radius of curvature of the concave surface of the first lens; $r_6$=the radius of curvature of the last refracting surface of the system; $n_1$=the index of refraction of the first lens (for the $d$ lines of helium); and $n_3$=the index of refraction of the third or biconvex lens (for the $d$ lines of helium).

2 Claims, 2 Drawing Figures

INVENTOR
HAJIME KAMIMURA

PHOTOGRAPHIC LENS SYSTEM

BACKGROUND OF THE INVENTION

The present invention relates to a photographic lens system, and more particularly a photographic lens system in which a stop or diaphragm may be positioned in an image space adjacent to the last refracting surface of the system.

In a conventional lens system consisting of three or four lenses, a stop or diaphragm is interposed between the first and second lenses or between the second and third lenses. When a stop or diaphragm is disposed behind the last refracting surface of the lens system in the image space, incident rays forming a relatively large angle with the optical axis of the lens system are cut out or vignetted as the diaphragm is stopped down, so that less light is directed to the edge of the field than to the center. This results in a serious problem when such a lens system is used for photographic purposes.

SUMMARY OF THE INVENTION

It is therefore an object of the present invention to provide an improved photographic lens system in which a stop or diaphragm may be positioned in the image space adjacent to the last refracting surface of the system.

It is another object of the present invention to provide an improved photographic lens system which effectively eliminates vignetting.

It is a more specific object of the present invention to provide an improved photographic lens system of the character described above with an aperture ratio of 1 : 2.8 and a field angle of 54°.

The present invention involves a lens system formed from a plurality of lens elements. It has been discovered that in order to eliminate vignetting in such a lens system, the following relation must be satisfied.

$0.3 f < \Sigma d < 0.35 f$ where $f=$ the focal length of the lens system; and $\rho d=$ the total thickness or dimension of the lens system along the optical axis thereof.

Furthermore, it has been discovered that the spherical aberration of such a lens system can be well balanced when the following condition is satisfied:

$0.105f < d_1 < 0.110f$ where $d_1=$ the thickness of the first lens element of the system facing toward an object.

When $\rho d$ is too small, a lens system of the character described cannot be achieved physically. On the other hand, when $\rho d$ is too large, vignetting cannot be sufficiently eliminated. In order to obtain a better image, it has been found that the following conditions must be also satisfied so as to balance the astigmatism as well as coma caused by the above described conditions:

$$0.8 f < r_2 < 1.0 f$$
$$0.55 f < r_6 < 0.65 f$$

where
$r_2=$ the radius of curvature of the surface of the first lens element of the system opposite from the surface facing an object; and
$r_6=$ the radius of curvature of the last refracting surface of the system facing the image plane of the system.

It has also been found that the following conditions must be satisfied for more advantageously correcting the Petzval sum and balancing curvature of field:

$$1.65 < n_1$$
$$1.65 < n_3$$

where $n_1$ and $n_3$ are the indices of refraction of the first and third lens elements of the system for the d lines of helium.

When the above conditions are satisfied, a photographic lens system with an aperture ratio of 1 : 2.8 and a field angle of 54° may be provided in which a stop or diaphragm can be positioned in the image space adjacent to the last refracting surface of the lens system and all of the optical aberrations are well balanced.

The above and other objects, features and advantages of the present invention will become more apparent from two examples described hereinafter with reference to the accompanying drawing.

DETAILED DESCRIPTION

Figure 1:
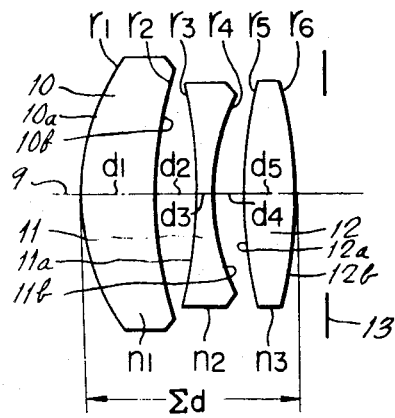
FIG. 1 is a diagrammatic side view of one embodiment of the present invention.

In FIG. 1 a triplet lens system in accordance with the invention is shown. A first positive single meniscus lens element 10 is included, having a convex surface 10a facing toward an object (not shown) and a concave surface 10b. Also included are a second lens element 11 comprising a biconcave lens with concave surfaces 11a and 11b, and a third or last lens element 12 comprising a biconvex lens with convex surfaces 12a and 12b. The surface 12b constitutes the last refracting surface of the lens system and faces toward an image plane (not shown). A stop or diaphragm 13 may be positioned in the image space adjacent the last refracting surface 12b.

The parameters of the lens system of FIG. 1 are as follows:

$r_1=$ the radius of curvature of the convex surface 10a facing toward an object of the first positive meniscus lens 10;

$r_2=$ the radius of curvature of the concave surface 10b of the meniscus lens 10;

$r_3$ and $r_4=$ the radii of curvature of the concave surfaces 11a and 11b of the second biconcave lens 11;

$r_5$ and $r_6=$ the radii of curvature of the convex surfaces 12a and 12b of the the third biconvex lens 12;

$d_1=$ the thickness of the first positive meniscus lens 10 along the optical axis 9 of the lens system;

$d_2=$ the length of the air space between the first and second lenses 10 and 11 measured along the optical axis 9;

$d_3=$ the thickness of the second lens 11 measured along the optical axis;

$d_4=$ the length of the air space between the second and third lens 11 and 12 measured along the optical axis 9;

$d_5=$ the thickness of the third lens 12 measured along the optical axis;

$n_1=$ the index of refraction of the first lens 10 for the d lines of helium;

$n_2=$ the index of refraction of the second lens 11 for the d lines of helium;

$n_3=$ the index of refraction of the third lens 12 for the d lines of helium;

$\gamma d_1=$ the Abbe number of the first lens 10 for the d lines of helium;

$\gamma d_2=$ the Abbe number of the second lens 11 for the d lines of helium; and $\gamma d_3=$ the Abbe number of the third lens 12 for the d lines of helium.

Two examples are given below of lens systems in accordance with the invention.

EXAMPLE 1

Focal length $f=1.0$
Aperture ratio 1:2.8
Field angle $=54°$

| $r_1$ | d | n | $\gamma d$ |
|---|---|---|---|
| $r_1=0.323f$ | $d_1=0.110f$ | $n_1=1.67000$ | $\gamma d_1=57.3$ |
| $r_2=0.680f$ | $d_2=0.057f$ | $n_2=1.59270$ | $\gamma d_2=35.4$ |
| $r_3=-0.830f$ | $d_3=0.026f$ | $n_3=1.69350$ | $\gamma d_3=53.4$ |
| $r_4=0.319f$ | $d_4=0.046f$ | | |
| $r_5=0.630f$ | $d_5=0.078f$ | | |
| $r_6=-0.630f$ | | | |

Seidel coefficients of aberrations in consideration of the position of a stop or diaphragm of Example 1 are as follows:

|   | Coefficient of sphercal aberration | Coefficient of coma | Coefficient of astigmatism | Petzval coefficient | Coefficient of distortion |
| --- | --- | --- | --- | --- | --- |
| 1 (surface 10a) | 7.11399 | 0.20460 | 0.00588 | 1.24119 | 0.03587 |
| 2 (surface 10b) | 0.00086 | 0.02174 | 0.54609 | −0.58961 | −1.09254 |
| 3 (surface 11a) | −3.63508 | 2.59215 | −1.84844 | −0.44856 | 1.63796 |
| 4 (surface 11b) | −8.78183 | −2.48867 | −0.70526 | −1.16718 | −0.53063 |
| 5 (surface 12a) | 3.02298 | 1.64224 | 0.89215 | 0.65007 | 0.83783 |
| 6 (surface 12b) | 4.13406 | −2.08016 | 1.04669 | 0.65009 | −0.85378 |
| Σ (lens system) | 1.85498 | −0.10810 | −0.06289 | 0.33600 | 0.03471 |

Figure 2:
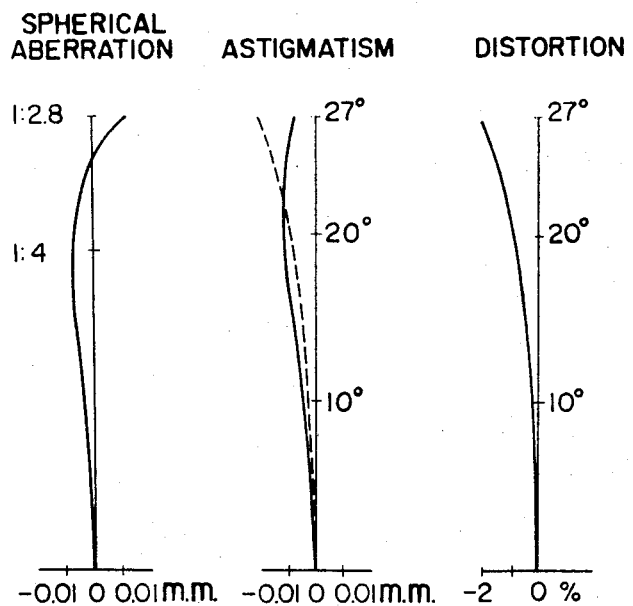
FIG. 2 is a graph showing aberration curves thereof.

Spherical aberration, astigmatism and distortion curves are shown in FIG. 2. Spherical aberration is plotted in terms of mm as a function of aperture ratio. Astigmatism is plotted in terms of mm. as a function of field angle. Distortion is plotted in terms of percent as a function of field angle.

EXAMPLE 2

Focal length $f=1.0$
Aperture ratio 1:2.8
Field angle = 54°

| r | d | n | γd |
| --- | --- | --- | --- |
| $r_1=0.320f$ | $d_1=0.105f$ | $n_1=1.67790$ | $\gamma d_1=55.5$ |
| $r_2=0.738f$ | $d_2=0.048f$ | $n_2=1.59270$ | $\gamma d_2=35.4$ |
| $r_3=-0.967f$ | $d_3=0.024f$ | $n_3=1.69680$ | $\gamma d_3=55.6$ |
| $r_4=0.320f$ | $d_4=0.057f$ | | |
| $r_5=0.774f$ | $d_5=0.080f$ | | |
| $r_6=-0.643f$ | | | |

Seidel coefficients of aberrations in consideration of the position of a stop or diaphragm of Example 2 are as follows:

|   | Coefficient of sphercal aberration | Coefficient of coma | Coefficient of astigmatism | Petzval coefficient | Coefficient of distortion |
| --- | --- | --- | --- | --- | --- |
| 1 (surface 10a) | 7.31772 | 0.18999 | 0.00493 | 1.26080 | 0.03286 |
| 2 (surface 10b) | 0.01035 | −0.08464 | 0.69218 | −0.54730 | −1.18490 |
| 3 (surface 11a) | −3.69304 | 2.70201 | −1.97693 | −0.38497 | 1.72806 |
| 4 (surface 11b) | −7.32593 | −2.04032 | −0.56824 | −1.16098 | −0.48160 |
| 5 (surface 12a) | 1.61902 | 1.08157 | 0.72254 | 0.53019 | 0.83689 |
| 6 (surface 12b) | 4.11095 | −2.07698 | 1.04935 | 0.63874 | −0.85288 |
| Σ (lens system) | 2.03907 | −0.22837 | −0.07617 | 0.33648 | 0.07843 |

What is claimed is:

1. A photographic lens system suitable for the inclusion of a stop in an image space adjacent to the last refracting surface of the system and having an equivalent focal length of about 1.0 and an aperture ratio of about 1:2.8 and a field angle of about 54°, comprising three individual lens elements, the first lens element comprising a positive single meniscus lens with its convex surface toward an object; the second lens element comprising a biconcave lens; the third lens element comprising a biconvex lens having a refractive surface facing the image plane; and said lens system substantially satisfying the following relations:

| range of r | range of d |
| --- | --- |
| $r_1=0.323f$ to $0.320f$ | $d_1=0.110f$ to $0.105f$ |
| $r_2=0.680f$ to $0.738f$ | $d_2=0.057f$ to $0.048f$ |
| $r_3=-0.830f$ to $-0.967f$ | $d_3=0.026f$ to $0.024f$ |
| $r_4=0.319f$ to $0.320f$ | $d_4=0.046f$ to $0.057f$ |
| $r_5=0.630f$ to $0.774f$ | $d_5=0.078f$ to $0.080f$ |
| $r_6=-0.630f$ to $-0.643f$ | |

| range of n | range of γd |
| --- | --- |
| $n_1=1.67000$ to $1.67790$ | $\gamma d_1=57.3$ to $55.5$ |
| $n_2=1.59270$ | $\gamma d_2=35.4$ |
| $n_3=1.69350$ to $1.69680$ | $\gamma d_3=53.4$ to $55.6$ | where:

$r_1$ = the radius of curvature of the convex surface facing toward an object of the first positive meniscus lens;

$r_2$ = the radius of curvature of the concave surface of the meniscus lens;

$r_3$ and $r_4$ = the radii of curvature of the concave surfaces of the second biconcave lens;

$r_5$ and $r_6$ = the radii of curvature of the convex surfaces of the third biconvex lens;

$d_1$ = the thickness of the first positive meniscus lens along the optical axis of the lens system;

$d_2$ = the length of the air space between the first and second lenses measured along the optical axis;

$d_3$ = the thickness of the second lens measured along the optical axis;

$d_4$ = the length of the air space between the second and third lenses measured along the optical axis;

$d_5$ = the thickness of the third lens measured along the optical axis;

$n_1$ = the index of refraction of the first lens for the $d$ lines of helium;

$n_2$ = the index of refraction of the second lens for the $d$ lines of helium;

$n_3$ = the index of refraction of the third lens for the $d$ lines of helium;

$\gamma d_1$ = the Abbe number of the first lens for the $d$ lines of helium;

$\gamma d_2$ = the Abbe number of the second lens for the $d$ lines of helium; and $\gamma d_3$ = the Abbe number of the third lens for the $d$ lines of helium.

2. A photographic lens system according to claim 1, in which the values of $r, d, n$ and $\gamma d$ are as follows:

| r | d | n | γd |
| --- | --- | --- | --- |
| $r_1=0.323f$ | $d_1=0.110f$ | $n_1=1.67000$ | $\gamma d_1=57.3$ |
| $r_2=0.680f$ | $d_2=0.057f$ | $n_2=1.59270$ | $\gamma d_2=35.4$ |
| $r_3=-0.830f$ | $d_3=0.026f$ | $n_3=1.69350$ | $\gamma d_3=53.4$ |
| $r_4=0.319f$ | $d_4=0.046f$ | | |
| $r_5=0.630f$ | $d_5=0.078f$ | | |
| $r_6=-0.630f$ | | | |

3. A photographic lens system according to claim 1, in which the values of $r, d, n$ and $\gamma d$ are as follows:

| r | d | n | γd |
| --- | --- | --- | --- |
| $r_1=0.320f$ | $d_1=0.105f$ | $n_1=1.67790$ | $\gamma d_1=55.5$ |
| $r_2=0.738f$ | $d_2=0.048f$ | $n_2=1.59270$ | $\gamma d_2=35.4$ |
| $r_3=-0.967f$ | $d_3=0.024f$ | $n_3=1.69680$ | $\gamma d_3=55.6$ |
| $r_4=0.320f$ | $d_4=0.057f$ | | |
| $r_5=0.774f$ | $d_5=0.080f$ | | |
| $r_6=-0.643f$ | | | |